United States Patent
Kawale et al.

(10) Patent No.: US 11,165,753 B1
(45) Date of Patent: Nov. 2, 2021

(54) SECURE DATA COMMUNICATION FOR USER INTERFACES

(71) Applicant: Amazon Technologies, Inc., Seattle, WA (US)

(72) Inventors: Manas Kawale, Seattle, WA (US); Adrien Charles Guerard, Seattle, WA (US); Siddharth Natarajan, Seattle, WA (US); Darshan Aralakuppe Prakash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 575 days.

(21) Appl. No.: 15/464,054

(22) Filed: Mar. 20, 2017

(51) Int. Cl.
  *H04L 9/32* (2006.01)
  *H04L 29/06* (2006.01)
  *G06F 21/53* (2013.01)
  *G06F 9/54* (2006.01)
  *G06F 40/14* (2020.01)

(52) U.S. Cl.
  CPC .......... *H04L 63/0428* (2013.01); *G06F 9/546* (2013.01); *G06F 21/53* (2013.01); *G06F 40/14* (2020.01)

(58) Field of Classification Search
  CPC ..... H04L 63/0428; G06F 9/546; G06F 21/53; G06F 17/2247
  See application file for complete search history.

(56) References Cited

U.S. PATENT DOCUMENTS

| | | | | |
|---|---|---|---|---|
| 10,417,588 | B1* | 9/2019 | Kreisel | G06Q 10/063 |
| 2005/0132222 | A1* | 6/2005 | Petrovic | H04L 9/3213 |
| | | | | 726/4 |
| 2013/0080319 | A1* | 3/2013 | Greenstone | G06Q 20/12 |
| | | | | 705/39 |
| 2013/0283400 | A1* | 10/2013 | Schneider | G06F 21/572 |
| | | | | 726/30 |
| 2014/0129922 | A1* | 5/2014 | Gnech | G06F 17/2247 |
| | | | | 715/234 |
| 2018/0069947 | A1* | 3/2018 | Antipa | H04L 67/327 |

OTHER PUBLICATIONS

Dang, Q., "Recommendation for Applications Using Approved Hash Algorithms," NIST Special Publication 800-107, Revision 1, Aug. 2012, 25 pages.

* cited by examiner

*Primary Examiner* — Trong H Nguyen
(74) *Attorney, Agent, or Firm* — Davis Wright Tremaine LLP

(57) ABSTRACT

An inline frame application receives an identifier that is specific to a request to obtain information associated with an item and code usable to generate an object within a browser application. The inline frame application transmits a request to an item information application to obtain the information associated with the item. In response to the request, the inline frame application obtains the information and data generated based at least in part on the information and the identifier. The inline frame application determines, based at least in part on the obtained data, that the information associated with the item is authentic. As a result, the inline frame application transmits the code and the information to a user interface of the browser application to generate the object.

18 Claims, 11 Drawing Sheets

SECURE DATA COMMUNICATION FOR USER INTERFACES

BACKGROUND

Browser extensions and other tools are often utilized to enhance the functionality of web browsers and other applications. For instance, a browser extension may change the user interface of a web browser by providing users with additional tools for interacting with a particular webpage. Providing these additional tools may involve changing code of the web browser and may leverage information from the webpage. However, it may be difficult or complex to prevent unauthorized changes to the code.

BRIEF DESCRIPTION OF THE DRAWINGS

Various techniques will be described with reference to the drawings, in which.

DETAILED DESCRIPTION

Figure 1:
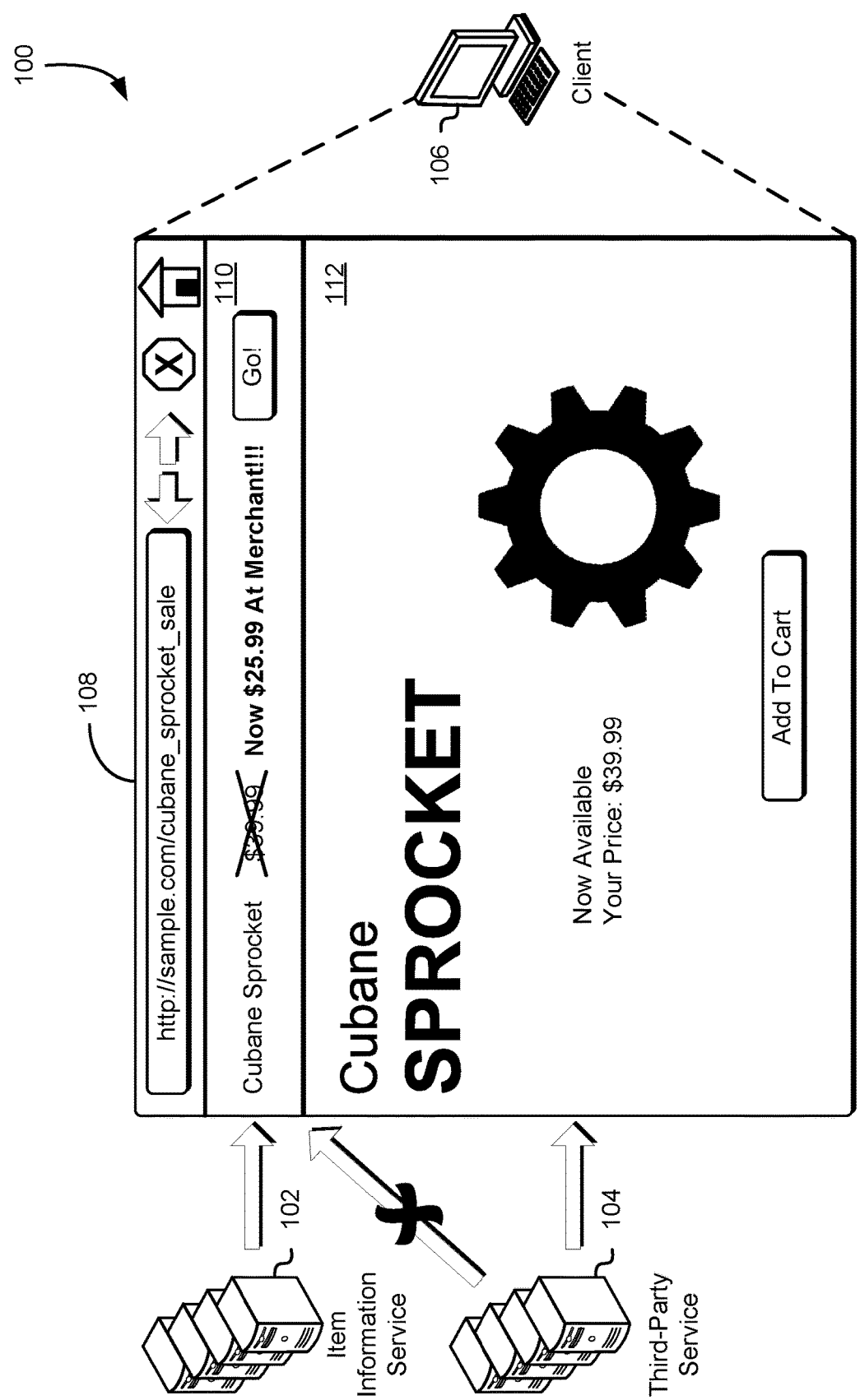
FIG. 1 shows an illustrative example of an environment in which various embodiments can be implemented.

This patent disclosure relates to enhancing the security of data transmitted between a browser extension and an inline frame or other tools implemented using a user interface of a web browser. In an example implementation of the techniques described in this document, a browser extension installed on a web browser of a client monitors webpages accessed via the web browser. If the browser extension detects that a webpage has been accessed, the browser extension may obtain the webpage source information (e.g., HyperText Markup Language (HTML) code, JavaScript, etc.) and evaluate this information to determine whether the webpage includes pricing information for an item that is available for purchase. For instance, if the web browser is used to access a retail website that includes various items for sale, the browser extension may evaluate a webpage of the website to identify the features of an item presented on the webpage, as well as pricing information for the item. If the browser extension identifies information for an item, the browser extension may generate an identifier for a request to an item information service to obtain a price match for the item. For instance, the item service may provide a better price for the item than a third-party service that is offering the item for sale via its webpage. The browser extension may transmit the request with this identifier to the item information service.

The item information service, in response to receiving the request from the browser extension, may generate information responsive to the request. This information may include the price match information requested by the browser extension for the item presented on the webpage. In some examples, the item information service obtains, from a cryptographic key management service, a cryptographic key that can be used to encrypt the identifier specified in the request. The item information service may provide the information responsive to the request and the encrypted identifier to the browser extension. In an example, the browser extension may append the encrypted identifier as a query parameter for a Uniform Resource Identifier (URI) of an inline frame to be generated via the user interface of the web browser and to be presented along with the webpage. Within the user interface of the web browser, the browser extension may generate a sandbox that may be used to present the inline frame if the information provided by the item information service is authenticated as having originated from the item information service and has not been tampered with by a third party.

The browser extension may provide the query parameters for the sandbox to the item information service web servers to enable the sandbox to obtain the decrypted identifier. For instance, the item information service web servers may obtain the cryptographic key from the cryptographic key management service to decrypt the encrypted identifier specified in the query parameters. The item information service web servers may provide the sandbox with code usable to generate the inline frame within the user interface of the web browser and the decrypted identifier. In response to receiving the code for the inline frame and the decrypted identifier, the sandbox may submit a request to the browser extension to provide the information provided by the item information service. In some examples, the browser extension generates a hash using the information provided by the item information service and the identifier as inputs to a hashing algorithm used to generate the hash. The browser extension may provide the resulting hash and the information provided by the item information service to the sandbox.

In an example, in response to receiving the hash and the information generated by the item information service from the browser extension, the sandbox uses the hashing algorithm to generate a second hash, using the provided information generated by the item information service and the identifier obtained from the item information service web servers as inputs to the hashing algorithm. The sandbox may compare the hash it has generated to the hash provided by the browser extension to determine if they are identical. If the sandbox determines that the hashes do not match, the sandbox may prevent presentation of the inline frame via the user interface of the web browser by not executing the code for the inline frame or using the information purportedly provided by the browser extension. For instance, if the hashes do not match, it may be indicative of tampering with either the identifier or the information provided by the item information service. However, if the sandbox determines that the hashes are identical, the sandbox can determine that the information provided by the item information service is authentic. As a result, the sandbox may execute the code for the inline frame and use the information provided by the browser extension to generate the inline frame within the user interface.

In this manner, an inline frame or other element of a web browser may be presented to users of a web browser using data provided by a browser extension while ensuring that the data has been authenticated as having originated from an item information service. In addition, the techniques described and suggested in this disclosure enable additional technical advantages. For instance, because the sandbox is used to evaluate information purportedly generated by the item information service for a particular item presented on the webpage, the sandbox may prevent any tampered information from being presented to users of the web browser. Further, if it is determined that the information purportedly generated by the item information service has been tampered with, the application used to execute the inline frame from the sandbox may alert a security service associated with the item information service to indicate that a third party is tampering with information transmitted by the browser extension to the inline frame application. This may enable the item information service to perform various actions to prevent further or future tampering of information provided by the browser extension, including updating the browser extension to further secure the information. Additionally, because the item from the item information service is provided to the item information application once and is verified within the sandbox, this reduces the amount of data from the service to authenticate the item information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user client 106 may submit an application layer request to a third-party service 104 to access a webpage 112 provided by the third-party service 104. The user client 106 may be a computer system that may include one or more applications installed on the computer system configured to access and communicate with various services, including the third-party service 104. The user client 106 may communicate with the third-party service 104 through one or more communications networks, such as the Internet. The application layer request from the user client 106 may include an informational field, such as a user-agent field, which may be used by the third-party service 104 to determine the application purportedly utilized by the user client 106 to transmit the request. For instance, the user-agent field may specify a browser application 108 (e.g., Internet Explorer®, Firefox®, Chrome®, etc.) used by user client 106 to communicate with the third-party service 104. The third-party service 104 may be a web service configured to provide webpages viewable through a browser application, such as browser application 108. The third-party service 104 may be an online retail service that provides various items and other items for sale to customers of the third-party service. For instance, via a webpage, a third-party service 104 may provide detailed information regarding a particular item, such as item manufacturer information, the manufacturer's suggested retail price (MSRP), the price at which the item is offered by the third-party service 104, a stock keeping unit (SKU) code for the item, an International Standard Book Number (ISBN) for the item, and the like.

The user client 106 may receive the webpage 112 from the third-party service 104 for rendering within the browser application 108. For instance, the webpage 112 may be generated using HTML code or other markup language codes (e.g., Extensible Markup Language (XML), Generalized Markup Language (GML), etc.) that may be executed by the browser application 108 to present the contents of the web page via a user interface of the browser application 108. In some instances, the webpage 112 may include elements used to illustrate detailed information of a particular item offered for sale by the third-party service 104. In an embodiment, the browser application 108 includes an item information application, which may be a browser extension (e.g., plug-in) provided by an item information service 102 and installed on to the browser application 108. The item information application may evaluate the HTML code or other markup language code of the webpage 112 to determine whether the webpage 112 specified detailed item information for a particular item. For instance, the item information application may obtain the markup language of the webpage 112 and evaluate the markup language of the webpage 112 to identify any detailed item information provided by the third-party service 104 for display on the webpage 112. This may include any information as described above including, but not limited to, item manufacturer information, the MSRP of the item, the price at which the item is offered by the third-party service 104, a SKU code for the item, and/or an ISBN for the item.

If the item information application identifies item information for a particular item from the webpage 112, the item information application may generate a request to the item information service 102 to obtain alternative information for the item, such as price match information. The item information service 102 may be associated with an online retail service that is a competitor of the third-party service 104 and provides similar items and other items for sale to customers. In the request, the item information application may provide an identifier corresponding to the request. This identifier may be a universally unique identifier (UUID) specific to the request. Alternatively, the identifier may be generated based at least in part on the item information garnered from the webpage 112. For example, the identifier may be generated using a combination of an item identifier, such as a SKU, and an item category identifier of the third-party service 104. If the identifier is generated using item information from the webpage 112, the item information application may generate the identifier in a manner that it is improbable for an identifier collision with other identifiers corresponding to other items or other requests.

In an alternative embodiment, the item information application (i.e., a computer system executing executable instructions of the item information application) submits a request to the item information service 102 to obtain the identifier usable in requests to obtain the additional item information. In this request, the item information application may include authentication information usable to authenticate the item information application. For instance, this authentication information may include a token that is verifiable by the item information service 102. For instance, the token may include data generated using an authentication seed known to the item information service 102 and to the entity authorized to utilize the seed to generate the token. The item information service 102 may provide the identifier if the authentication information provided by the item information application is authentic. For example, if the item information application provides a token along with the request to obtain an identifier, the item information service 102 may use the authentication seed assigned to the item information application to obtain the expected token. If the tokens match, the item information service 102 may determine that the item information application has been authenticated and provide the identifier.

Additionally, it should be noted that while identifiers are used throughout the disclosure for the purpose of illustration, other sufficiently unique pieces of information that may not typically be classified as identifiers are considered as being within the scope of the present disclosure. Tokens, for example, may be used as a shared secret that is specific to the request to obtain the item information. For instance, similar to the process described above, the item information application or the item information service 102 may generate a random string of characters that are sufficiently unique to serve as a token specific to the request. Alternatively, the item information application or the item information service 102 may utilize a seed to generate a token that is unique based at least in part on the time at which the token was generated. Thus, the token may be verifiable by using the seed and determining whether the token corresponds to the seed at the time at which the token was generated.

In response to receiving the request from the item information application, the item information service 102 may generate information responsive to the request. This information may include the price at which the particular item is offered for sale by an online retail service associated with the item information service 102. Additionally, the information responsive to the request may specify other item information, such as customer reviews for the item, warranty information for the item, availability information, images of the item, and the like. In an embodiment, the item information service 102 submits a request to a cryptographic key management service to obtain a cryptographic key usable to encrypt the identifier generated by the item information application on the client 106. The item information service 102 may use the cryptographic key to encrypt the provided identifier for the request. The item information service 102 may provide the information responsive to the request and the encrypted identifier to the item information application by transmitting the information responsive to the request and the encrypted identifier to the client 106. Additionally, the item information service 102 may provide the encrypted identifier to the cryptographic key management service to enable the cryptographic key management service to associate the encrypted identifier with the cryptographic key used to encrypt the identifier.

The item information application, in response to receiving the information responsive to its request and the encrypted identifier, may append the encrypted identifier as a query parameter to a URI for an inline frame 110 that is to be presented via the user interface of the browser application 108 and in conjunction with the webpage 112 of the third-party service 104. Additionally, the item information application may generate a sandbox within the user interface of the browser application 108 that can be used to evaluate the information provided by the item information service 102 to determine whether it is authentic. The item information application may provide the query parameters for the inline frame 110 to one or more item information service web servers, which may generate the markup language code for creation of the inline frame 110 within the user interface of the browser application 108.

The item information service web servers may receive the query parameters from the item information application and determine whether these query parameters include an encrypted identifier. If the query parameters do not include an encrypted identifier, the item information service web servers may reject the query parameters and prevent the inline frame 110 from being displayed via the user interface of the browser application 108. If the query parameters include the encrypted identifier, the item information service web servers may submit a request to the cryptographic key management service to obtain a cryptographic key usable to decrypt the encrypted identifier. The request may include the encrypted identifier or an identifier associated with the encrypted identifier that the cryptographic key management service may use to identify the cryptographic key originally used to encrypt the identifier. The cryptographic key management service may transmit the cryptographic key to the item information service web servers. Alternatively, if the encrypted key is provided to the cryptographic key management service as part of the request, the cryptographic key management service may decrypt the encrypted key itself using the cryptographic key and provide the identifier to the item information service web servers to fulfill the request. If the cryptographic key management service is unable to identify the cryptographic key usable to decrypt the encrypted identifier, the item information service web servers may reject the query parameters and prevent the inline frame 110 from being generated within the user interface of the browser application 108.

The item information service web servers, in response to receiving the cryptographic key from the cryptographic key management service, may decrypt the encrypted identifier from the query parameters to obtain the identifier. The item information service web servers may generate the markup language code that may be used to present the inline frame 110 within the user interface of the browser application 108. Within the markup language code of the inline frame 110, the item information service web servers may embed the identifier. The item information service web servers may transmit the markup language code of the inline frame 110 to the sandbox, which may be used to verify the authenticity of the information provided by the item information service 102.

In response to receiving the markup language code of the inline frame 110, an application operating within the sandbox usable to execute the markup language code of the inline frame 110 may submit a request to the item information application to provide the information provided by the item information service 102. In response to the request from the application in the sandbox, the item information application may use the information provided by the item information service 102 and the identifier corresponding to the request submitted to the item information service 102 as inputs to a hash function to obtain a hash. The item information application may provide the hash and the information provided by the item information service 102 to the application to fulfill the request.

The application operating within the sandbox may obtain the embedded identifier from the markup language code of the inline frame 110 and use the identifier and the provided information from the item information service 102 as inputs to a hash algorithm to obtain a second hash. This hash algorithm may be identical to the hash algorithm utilized by the item information application to generate its hash. The application operating within the sandbox may compare the hash obtained from the item information application to the second hash to determine whether these hashes are identical. If the hashes are not identical, the application may reject the provided information from the item information application and prevent the inline frame 110 from being presented via the user interface of the browser application 108. For instance, if the hashes are not identical, this may denote that the information provided by the item information application has been tampered with or has otherwise been modified without authorization, as the identifier is not exposed to the third-party service 104 or any other entity other than those associated with the item information service 102 at any time.

If the hashes are identical, the application operating within the sandbox may determine that the information provided by the item information application is authentic and was provided to the item information application by the item information service 102. The application operating within the sandbox may use the markup language code for the inline frame 110 to generate the inline frame 110 within the user interface of the browser application 108. Further, the application operating within the sandbox may utilize the information from the item information service 102 to populate the inline frame 110 with information regarding the item presented on the webpage 112 of the third-party service 104. A user of the client 106 may use the browser application 108 to interact with both the webpage 112 and the inline frame 110 to view item information for the particular item.

It should be noted that while items and item information are utilized throughout the disclosure for the purpose of illustration, the item information application or other extension of the browser application may evaluate the webpage 112 to obtain any data that can be used to obtain alternative data that can be presented via the inline frame 110. For instance, the extension of the browser application may evaluate the markup language code of the webpage 112 to identify data comprising information that may be used to provide alternative information associated with the information via the inline frame 110. This information may include information regarding news articles, restaurant reviews and recommendations, sports statistics, and any other information that may be provided by various sources. Thus, this disclosure is not limited to items and item information and alternatives are within the scope of this disclosure.

Figure 2:
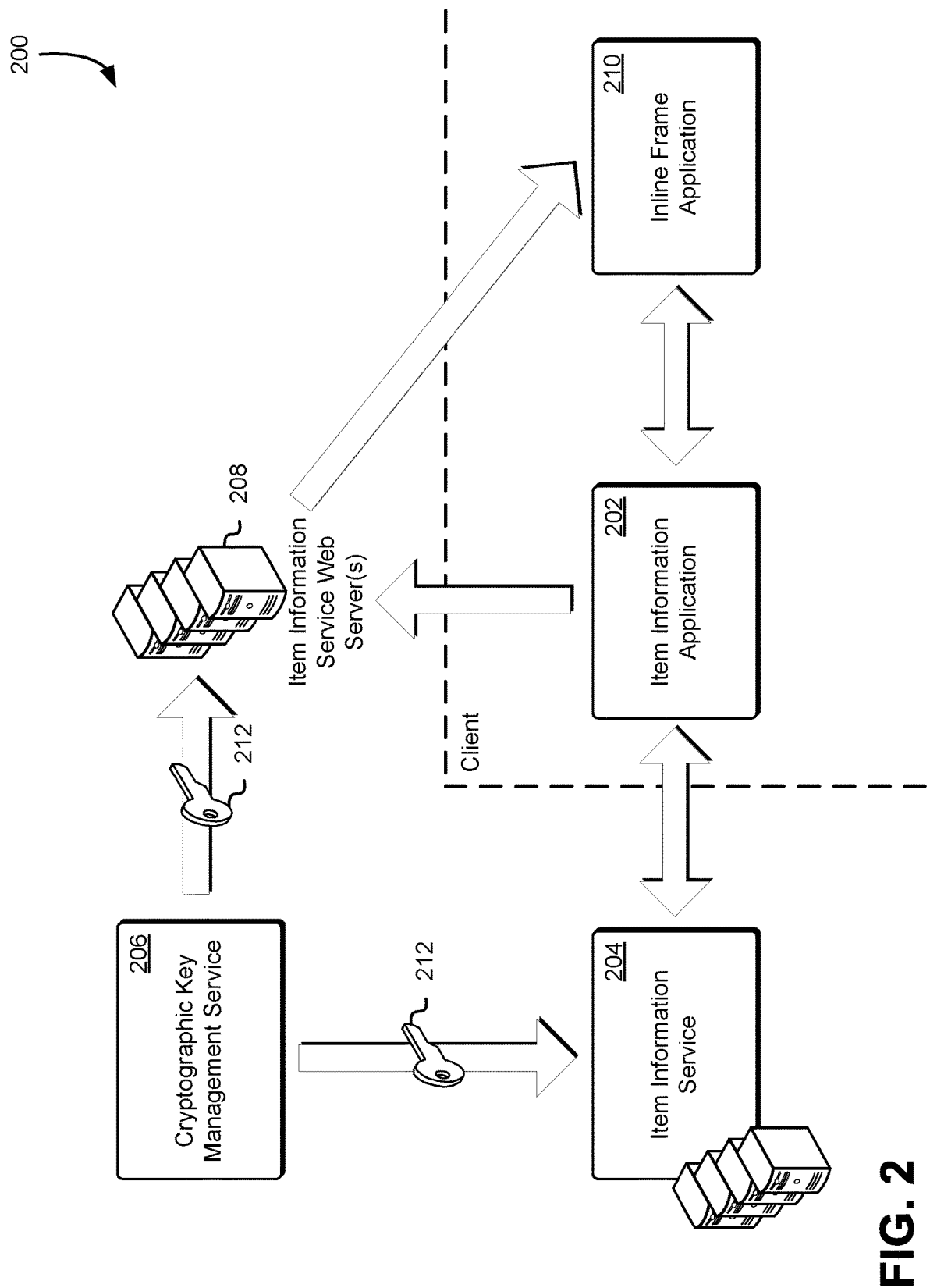
FIG. 2 shows an illustrative example of an environment in which an inline frame is generated using information from an item information service in accordance with at least one embodiment.

As noted above, an item information application installed on a client device to enhance the functionality of a browser application may monitor webpages presented via the browser application to determine whether information associated with an item offered for sale by an online retail service is being presented. If so, the item information application may generate a request to an item information service to obtain additional item information for the particular item and may generate a sandbox to create an inline frame within the user interface of the browser application that may be displayed along with the particular webpage. To ensure that the information presented via the inline frame is authentic, the item information application and an inline frame application operating within the sandbox may use hash algorithms to verify the authenticity of the information provided by the item information service. Accordingly, FIG. 2 shows an illustrative example of an environment 200 in which an inline frame is generated using information from an item information service in accordance with at least one embodiment.

In the environment 200, an item information application 202 installed on a client device and operable as an extension of a browser application of the client device may monitor webpages accessed via the client device to determine whether a webpage including information regarding an item has been accessed. For instance, if the browser application is used to access a webpage, the item information application 202 may obtain the markup language code for the webpage. The item information application 202 may evaluate the markup language code to determine whether the code specifies one or more elements of an item being offered via the webpage by a third-party service. These one or more elements may include an item name and description, a SKU for the item, an ISBN for the item, pricing information for the item, customer reviews for the item, and the like. The item information application 202 may be a software component of an existing computer program that adds functionality to the computer program. It should be noted that the item information application 202 may, in some instances, function as a separate software application (e.g., distinct from the browser application) installed on the client device.

If the item information application 202 identifies item information in the markup language code of the webpage, the item information application 202 may generate a request to obtain item matching information from an item information service 204. Additionally, the item information application 202 may generate an identifier corresponding to the request. This identifier may be a UUID specific to the request. Alternatively, the identifier may be generated based at least in part on the item information garnered from the webpage. If the identifier is generated using item information from the webpage, the item information application 202 may generate the identifier in a manner that it is improbable for an identifier collision with other identifiers corresponding to other items or requests. The item information application 202 may submit the request, which may include the identifier and the item information obtained from the webpage, to the item information service 204.

The item information service 204 may include one or more computer systems dedicated to providing product information for a variety of items offered by an online retail service via a communications network, such as the Internet. The item information service 204 may include one or more databases that may include an entry corresponding to each item offered by the online retail service. Each entry may specify the price at which the item is offered, item descriptions, customer reviews of the item, images and other multimedia for highlighting the item, identifiers corresponding to the item, recommendations for other items, and the like. In response to the request from the item information application 202, the item information service 204 may evaluate the item information specified in the request to identify one or more features of the item. The item information service 204 may utilize these identified one or more features to determine whether there is a corresponding entry in its databases for the item. For instance, if the item information service 204 identifies, within the request, a SKU for a particular item, the item information service 204 may query the one or more databases to identify an entry corresponding to the SKU. The item information service 204 may use the item information specified in the entry for the item to generate information responsive to the request. This information may include the price at which the item is being offered by the online retail service, customer reviews of the item, ratings for the item, images and multimedia for the item, and the like.

In an embodiment, the item information service 204 transmits a request to a cryptographic key management service 206 to obtain a cryptographic key 212 usable to encrypt the identifier specified in the request from the item information application 202. The cryptographic key management service 206 may include one or more computer systems that are used to create and control cryptographic keys that can be used to encrypt and decrypt data maintained by other computing services. For instance, a customer of a computing resource service provider may transmit a request to the cryptographic key management service 206 to create one or more cryptographic keys that may be used to encrypt a customer's data stored within various computing services provided by a computing resource service provider. The cryptographic key management service 206 may provision the requested cryptographic keys and utilize these cryptographic keys to encrypt the customer's data as specified in requests from the customer. In some examples, the cryptographic key management service 206 may generate and provide the cryptographic key 212 in response to the request. The item information service 204 may use the provided cryptographic key 212 to encrypt the identifier. The encrypted identifier may include metadata usable by the cryptographic key management service 206 to identify the cryptographic key 212 utilized to encrypt the identifier.

In an alternative embodiment, the item information service 204 transmits the identifier to the cryptographic key management service 206 for encryption. In response to the request from the item information service 204, the cryptographic key management service 206 may identify a cryptographic key 212 for encrypting the identifier. The cryptographic key management service 206 may encrypt the identifier using the cryptographic key 212 and include, in the metadata of the encrypted identifier, another identifier that can be used by the cryptographic key management service 206 to identify the cryptographic key 212 for decrypting the encrypted identifier. The cryptographic key management service 206 may provide the encrypted identifier to the item information service 204 to fulfill the request from the item information service 204.

The item information service 204 may provide the encrypted identifier and the information responsive to the request to the item information application 202 to fulfill the request. In response to receiving the encrypted identifier and the item information from the item information service 204, the item information application 202 may append the encrypted identifier to a URI of the inline frame to be presented via the user interface of the browser application. For instance, the item information application 202 may generate a query parameter that specifies the encrypted identifier. The item information application 202 may provide the URI, including the query parameter specifying the encrypted identifier, to one or more item information service web servers 208. The one or more item information service web servers 208 may include one or more computer systems that implement software for the development of webpages, including webpages presented via inline frames, on behalf of the item information service 204. Additionally, the item information application 202 may initiate an inline frame application 210 within a sandbox environment. The inline frame application 210 may generate the inline frame within the user interface of the browser application based at least in part on markup language code for the inline frame from the item information service web servers 208. The item information application 202 may provide network address information for the inline frame application 210 to the item information service web servers 208 along with the URI for the inline frame.

The item information service web servers 208 may evaluate the URI to identify the query parameters and determine whether these query parameters include the encrypted identifier. If the query parameters do not include the encrypted identifier, the item information service web servers 208 may reject the query parameters, thus preventing the inline frame from being generated. If the query parameters specify the encrypted identifier, the item information service web servers 208 may transmit the encrypted identifier to the cryptographic key management service 206 for decryption. As noted above, the encrypted identifier may include metadata that may be used to identify the cryptographic key 212 used to encrypt the identifier. The cryptographic key management service 206 may use the metadata for the encrypted identifier to obtain the cryptographic key 212. The cryptographic key management service 206 may use the cryptographic key 212 to decrypt the encrypted identifier and obtain the identifier, which the cryptographic key management service 206 may provide to the item information service web servers 208 to fulfill the request. In some embodiments, the item information service web servers 208 transmit a request to obtain the cryptographic key 212 for decrypting the encrypted identifier. The request may include the metadata of the encrypted identifier, which may be used by the cryptographic key management service 206 to identify the cryptographic key 212. The cryptographic key management service 206 may transmit the cryptographic key 212 to the item information service web servers 208, which may use the cryptographic key 212 to decrypt the encrypted identifier and obtain the identifier.

The item information service web servers 208 may generate markup language code for the inline frame to be presented via the user interface of the browser application. Within the markup language code, the item information service web servers 208 may embed the identifier. The item information service web servers 208 may provide the markup language code, including the identifier, to the inline frame application 210 operating within the sandbox environment created by the item information application 202. In response to receiving the markup language code from the item information service web servers 208, the inline frame application 210 may transmit a request to the item information application 202 to provide the item information provided by the item information service 204 to the item information application 202.

The item information application 202, in response to the request from the inline frame application 210, may use the information provided by the item information service 204 and the identifier as inputs to a hashing algorithm to generate a hash. The hashing algorithm may be a one-way function, which may include functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

The item information application 202 may provide the generated hash and the information provided by the item information service 204 to the inline frame application 210. The inline frame application 210 may use the provided information and the identifier from the item information service web servers 208 as inputs to a hashing algorithm to obtain a second hash. The hashing algorithm utilized by the inline frame application 210 may be identical to the hashing algorithm utilized by the item information application 202 to generate the hash provided to the inline frame application 210. The inline frame application 210 may compare the second hash to the hash provided by the item information application 202 to determine whether these hashes are identical. If the hashes are not identical, this may denote that the item information received by the inline frame application 210 has been modified in transit from the item information application 202 to the inline frame application 210, as the identifier is not exposed to other entities. As a result, the inline frame application 210 may reject the information and not execute the markup language code of the inline frame provided by the item information service web servers 208. Thus, the user interface of the browser application may not be updated to include the inline frame. In some instances, the inline frame application 210 may transmit a notification to the item information service 204 to indicate that information is being modified without authorization during transit. This may cause the item information service 204 to perform remedial operations to prevent unauthorized modification of the information, including encrypting the information provided to the item information application 202, disguising the information such that a third-party may not recognize the information as being item information, and the like.

If the hashes match, the inline frame application 210 may determine that the information provided by the item information application 202 is authentic. The inline frame application 210 may use the markup language code provided by the item information service web servers 208 and the item information provided by the item information application 202 to generate an inline frame within the user interface of the browser application. The inline frame may be presented along with the webpage of the third-party service to enable users of the client to compare the item information. It should be noted that while inline frames are used extensively throughout the present disclosure for the purpose of illustration, other elements may be presented via the markup language code provided by the item information service web servers 208. For instance, the browser application may be updated to present a pop-up window via the user interface to present the item information. Similarly, the browser application may be updated to present a JavaScript object via the user interface which may be used to present the item information.

Figure 3:
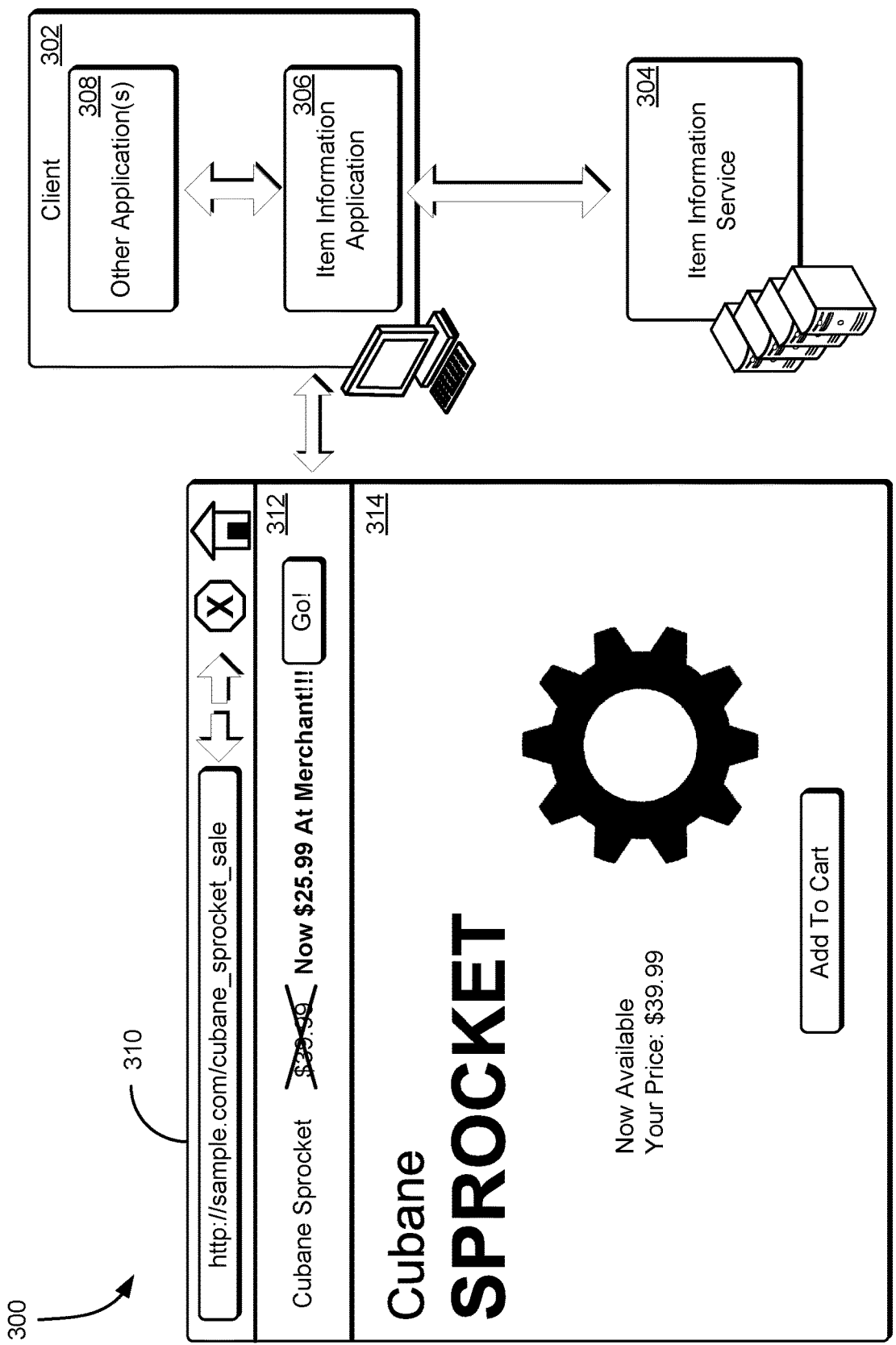
FIG. 3 shows an illustrative example of an environment in which an inline frame is presented via a user interface of a browser application using information garnered from a webpage in accordance with at least one embodiment.

As noted above, an item information application installed on a client device may obtain item information for a particular item from an item information service. The item information application may generate a sandbox environment and cause the client to execute an inline frame application for generating and presenting the inline frame. This inline frame application may determine whether the item information provided by the item information application has been modified by an unauthorized third-party or by another application installed on the client device. If the item information has not been modified and is authenticated, the inline frame application may present the inline frame and include, within the inline frame, the item information. Accordingly, FIG. 3 shows an illustrative example of an environment 300 in which an inline frame 312 is presented via a user interface of a browser application 310 using information garnered from a webpage 314 in accordance with at least one embodiment.

In the environment 300, an item information application 306 installed on a client 302 monitors a webpage 314 accessed via a browser application 310 to determine whether the webpage 314 includes information regarding an item available for sale. To determine whether the webpage 314 includes such information, the item information application 306 may evaluate the markup language code for the webpage 314 to determine whether the markup language code specifies item information. If the markup language code for the webpage 314 specifies item information, the item information application 306 may generate a request to obtain item information from an item information service 304. The item information from the item information service 304 may include an alternative retail price for the item as offered by an online retail service associated with the item information service 304, as well as other information that may be useful to a user evaluating the item. In the request, the item information application 306 may include an identifier specific to the request, as well as the item information obtained from the webpage 314.

The item information service 304 may interact with a cryptographic key management service to encrypt the identifier. In response to the request from the item information application 306, the item information service 304 may generate information responsive to the request (e.g., item information as made available via the online retail service), which the item information service 304 may provide to the item information application 306 along with the encrypted identifier. The item information application 306 may provide the encrypted identifier as a query parameter to one or more item information service web servers, which may decrypt the encrypted identifier and provide the identifier to an inline frame application operating within a sandbox environment of the client 302. The inline frame application may submit a request to the item information application 306 to obtain the item information provided by the item information service 304.

In response to the request from the inline frame application, the item information application 306 may provide the item information from the item information service 304 and a hash generated using the item information and the identifier as inputs to a hashing algorithm. In some instances, other applications 308 installed on the client may intercept the response from the item information application 306 and evaluate the item information. As an example, a third-party service may use an application installed on the client 302 to evaluate item information generated using information from its webpage 314. This application may potentially modify the item information to provide erroneous information. The inline frame application may use the identifier from the item information service web servers and the item information from the item information application 306 as inputs to a hashing algorithm to obtain a second hash.

If the inline frame application determines that the hashes (e.g., hash from the item information application 306 and the second hash) are identical, the inline frame application may determine that the item information is authentic and has not been modified by any other application 308 of the client 302 or by any other entity. The inline frame application may generate the inline frame 312 and present, via the inline frame 312, the item information provided by the item information application 306 and generated by the item information service 304. The inline frame 312 may be presented via the user interface of the browser application 310 and in conjunction with the webpage 314.

Figure 4:
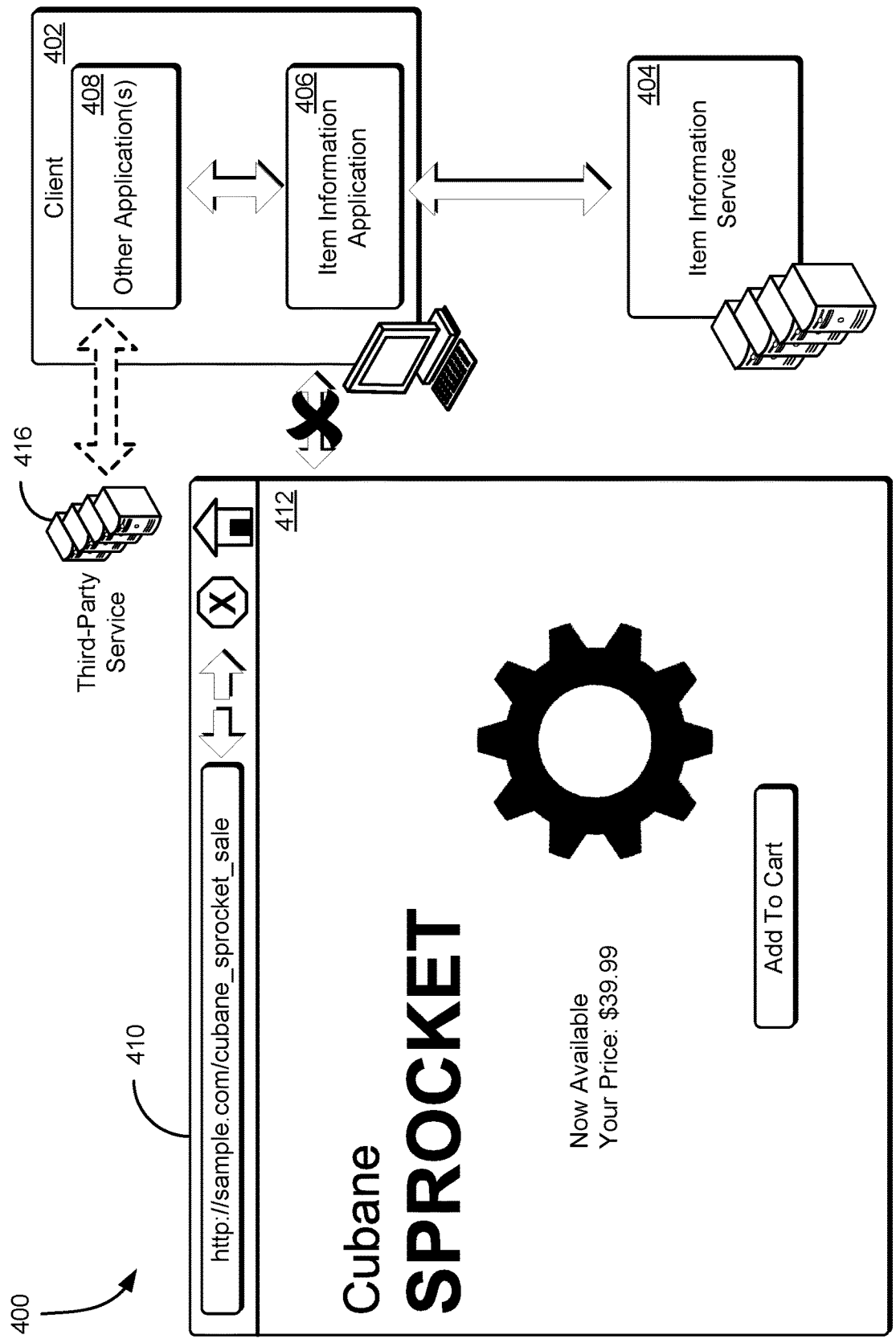
FIG. 4 shows an illustrative example of an environment in which a client prevents presentation of an inline frame as a result of a determination that a third-party service has modified data provided by the item information service in accordance with at least one embodiment.

FIG. 4 shows an illustrative example of an environment 400 in which a client 402 prevents presentation of an inline frame as a result of a determination that a third-party service 416 has modified data provided by the item information service 404 in accordance with at least one embodiment. The environment 400 may be similar to the environment 300 illustrated in FIG. 3. For instance, the environment 400 includes a client 402 that includes an item information application 406 and other applications 408 that may be used to enhance the functionality of a browser application 410. The item information application 406 may communicate with an item information service 404 to obtain item information for a particular item presented via a webpage 412.

In some instances, a third-party service 416 may use one or more other applications 408 installed on the client 402 to monitor for transmission of item information from another service, such as the item information service 404 and applications associated with the item information service 404, such as the item information application 406. These one or more other applications 408 may obtain item information from other sources and modify this information to provide erroneous or misleading information. As noted above, the inline frame application may evaluate the hash from the item information application 406 and a second hash generated using the item information provided by the item information application 406 and the identifier generated by the item information application 406 as inputs to a hashing algorithm. If the hashes do not match, the inline frame application may determine that the item information has been modified by one or more other applications 408 or by a third-party service 416 and, thus, cannot be used within an inline frame.

If the inline frame application determines that the item information has been modified without authorization, the inline frame application may prevent presentation of the inline frame and the modified item information via the browser application 410. For instance, the inline frame application may discard the item information and the markup language code for the inline frame. Alternatively, the inline frame application may present an inline frame via the user interface of the browser application 410 but without the modified item information. Instead of providing the modified item information, the inline frame application may provide information for the online retail service associated with the item information service 404, such as through an advertisement. In some examples, the inline frame application may transmit a notification to the item information service 404 to indicate that the item information has been modified without authorization. This may cause the item information service 404 to perform one or more remedial operations, such as encrypting the item information.

Figure 5:
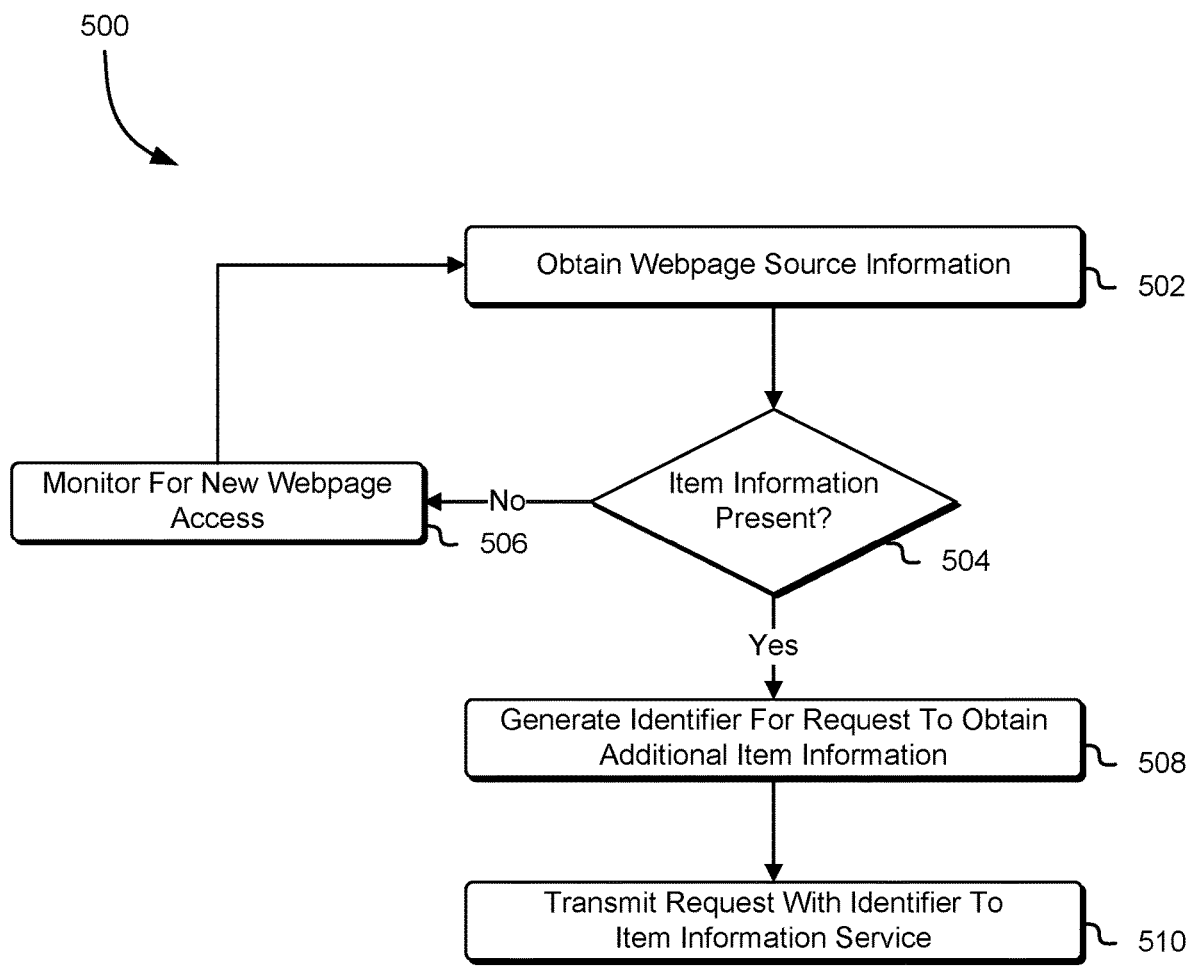
FIG. 5 shows an illustrative example of a process for generating a request to obtain additional item information for an item presented on a webpage in accordance with at least one embodiment.

As noted above, a client may include an item information application, which may enhance the functionality of a browser application by providing item information for a item presented via a webpage to an inline frame application for presentation. The item information application may evaluate the markup language code of a webpage accessed via the browser application to determine if the webpage includes item information for an item that may be available for sale by an online retail service. If so, the item information application may submit a request to an item information service to obtain item information for the particular item presented via the webpage. Accordingly, FIG. 5 shows an illustrative example of a process 500 for generating a request to obtain price match information for an item presented on a webpage in accordance with at least one embodiment. The process 500 may be performed by the aforementioned item information application installed on a client device.

The item information application may be executed in response to the browser application being executed on a client device. If the browser application is utilized to access a webpage, the item information application may obtain 502 the webpage source information. The webpage source information may include the markup language code used to present the webpage via the user interface of the browser application. The webpage source information may identify one or more elements presented via the browser application. For instance, the webpage source information may specify the source for the images, text, and other multimedia presented on the webpage.

The item information application may evaluate the webpage source information to determine 504 whether there is any item information present within the webpage source information. For instance, the item information application may evaluate the webpage source information to determine whether the webpage specifies, for a particular item, item manufacturer information, the MSRP of the item, the price at which the item is offered by the third-party service, a SKU code for the item, an ISBN for the item, or other information regarding an item offered for sale by a third-party service via the webpage. If the webpage source information does not specify any item information, the item information application may continue to monitor 506 for new webpage access. Thus, if the item information application detects that a new webpage has been accessed, the item information application may obtain and evaluate the webpage source information for this new webpage.

If the webpage source information specifies information regarding an item available for purchase via the webpage, the item information application may generate 508 an identifier corresponding to a request to obtain price matching information, as well as other item information, for the item. This identifier may be a UUID specific to the request. Alternatively, the identifier may be generated based at least in part on the item information garnered from the webpage. For example, the identifier may be generated using a combination of an item identifier, such as a SKU, and an item category identifier of the third-party service and specified in the webpage source information. If the identifier is generated using item information from the webpage, the item information application may generate the identifier in a manner that it is improbable for an identifier collision with other identifiers corresponding to other items or other requests.

The item information application may transmit 510 the request with the generated identifier to the item information service to obtain item information corresponding to the item identified in the webpage source information. The request may specify the identifier and the item information obtained from the webpage source information. The item information service may be associated with an online retail service that may also provide the item for sale and may have its own item information for the item. This may include an alternative price for the item, customer reviews of the item, warranty information, quantity of the item available, and the like.

Figure 6:
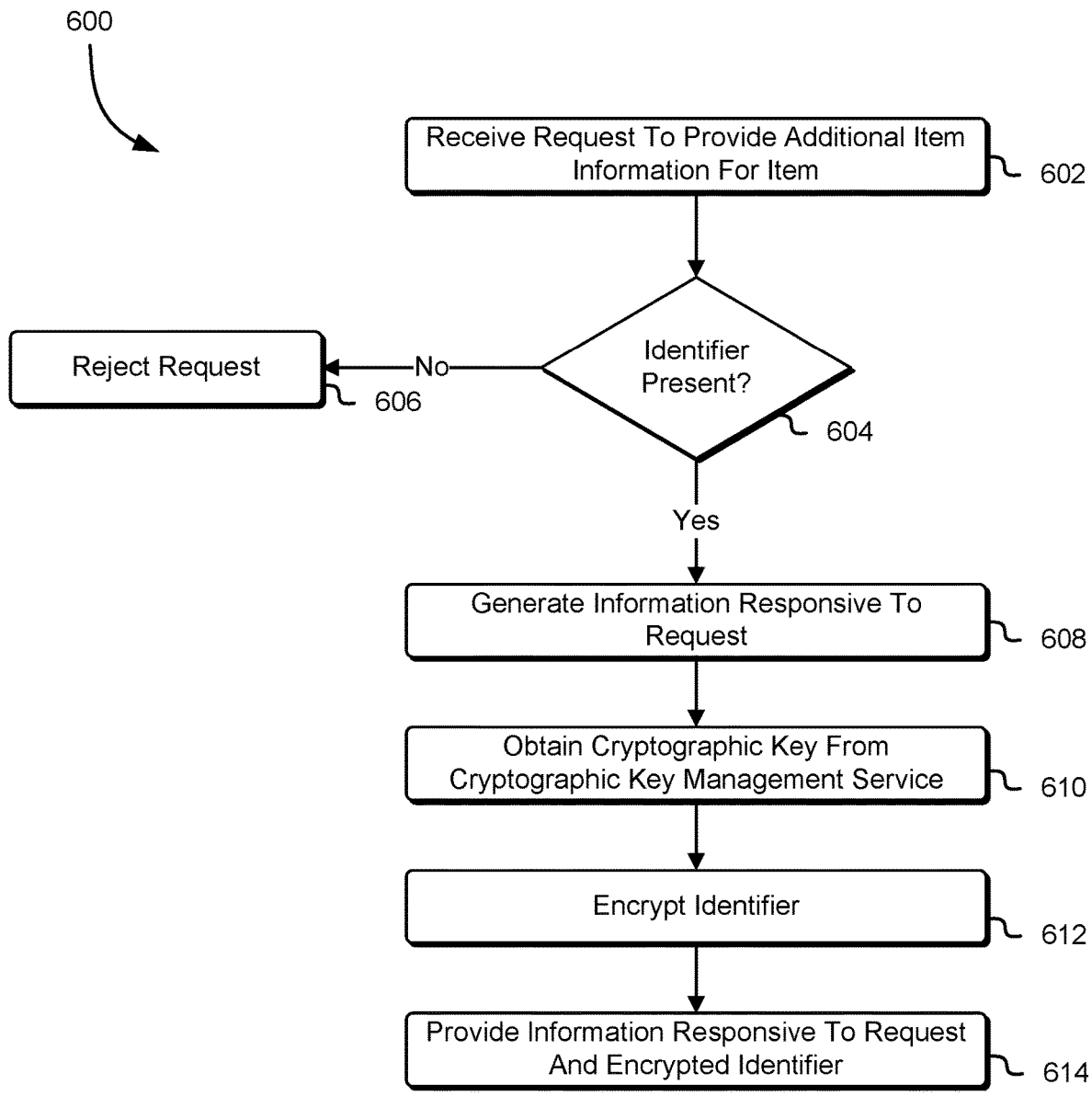
FIG. 6 shows an illustrative example of a process for providing information response to a request to obtain additional item information for an item and an encrypted identifier corresponding to the request in accordance with at least one embodiment.

As noted above, an item information service may provide item information associated with an item made available for purchase through an online retail service in response to a request from an item information application operating on a client device and in conjunction with a browser application of the client device. In some embodiments, the item information service obtains an identifier from the request and encrypts the identifier. The item information service may provide the encrypted identifier and the item information to the item information application to fulfill the request. Accordingly, FIG. 6 shows an illustrative example of a process 600 for providing information response to a request to obtain price match information for an item and an encrypted identifier corresponding to the request in accordance with at least one embodiment. The process 600 may be performed by the aforementioned item information service, which may maintain item information for various items offered by an online retail service. Further, the item information service may communicate with a cryptographic key management service to encrypt the identifier provided in the request.

At any time, the item information service may receive 602 a request from an item information application of a client device to provide price match information and other item information for a particular item. The request may specify one or more elements of the item, including, but not limited to, item manufacturer information, the MSRP of the item, the price at which the item is offered by the third-party service, a SKU code for the item, an ISBN for the item, or other information regarding an item offered for sale by a third-party service via a webpage evaluated by the item information application. As noted above, the item information application may generate an identifier specific to the request. This identifier may be used to verify that the request originated from an item information application. Thus, the item information service may determine 604 whether the received request includes an identifier specific to the request.

If the request does not specify an identifier that is specific to the request, the item information service may reject 606 the request, as the item information service may be unable to ensure the security of the item information to be provided in response to the request without the identifier, as described above. However, if the request does specify an identifier that is specific to the request, the item information service may generate 608 information responsive to the request. For instance, the item information service may use the item information specified in the request to identify one or more entries in a database that are specific to the item. As an illustrative example, if the provided item information includes a SKU for the item, the item information service may query the one or more databases to identify an entry for the item that specifies this SKU. Alternatively, the item information service may transmit the item information from the request to an online retail service to obtain alternative item information for the item from the online retail service. The item information service may use the entries identified in the one or more databases or the information provided by the online retail service to generate the information responsive to the request.

In an embodiment, the item information service transmits a request to a cryptographic key management service to obtain 610 a cryptographic key usable to encrypt the identifier. In response to the request from the item information service, the cryptographic key management service may generate and provide the cryptographic key. Alternatively, in some embodiments, the item information service transmits the identifier to the cryptographic key management service for encryption. In response to the request from the item information service, the cryptographic key management service may identify a cryptographic key for encrypting the identifier. The cryptographic key management service may encrypt the identifier using the cryptographic key and include, in the metadata of the encrypted identifier, another identifier that can be used by the cryptographic key management service to identify the cryptographic key for decrypting the encrypted identifier. The cryptographic key management service may provide the encrypted identifier to the item information service to fulfill the request from the item information service.

If the cryptographic key management service provides a cryptographic key to the item information service, the item information service may use the cryptographic key to encrypt 612 the identifier. The item information service may provide 614 the information response to the request and the encrypted identifier to the item information application to fulfill the request from the item information application. In some instances, if the cryptographic key management service provided a cryptographic key to the item information service, the item information service may provide metadata associated with the encrypted identifier to the cryptographic key management service to enable the cryptographic key management service to identify the cryptographic key used to encrypt the identifier.

Figure 7:
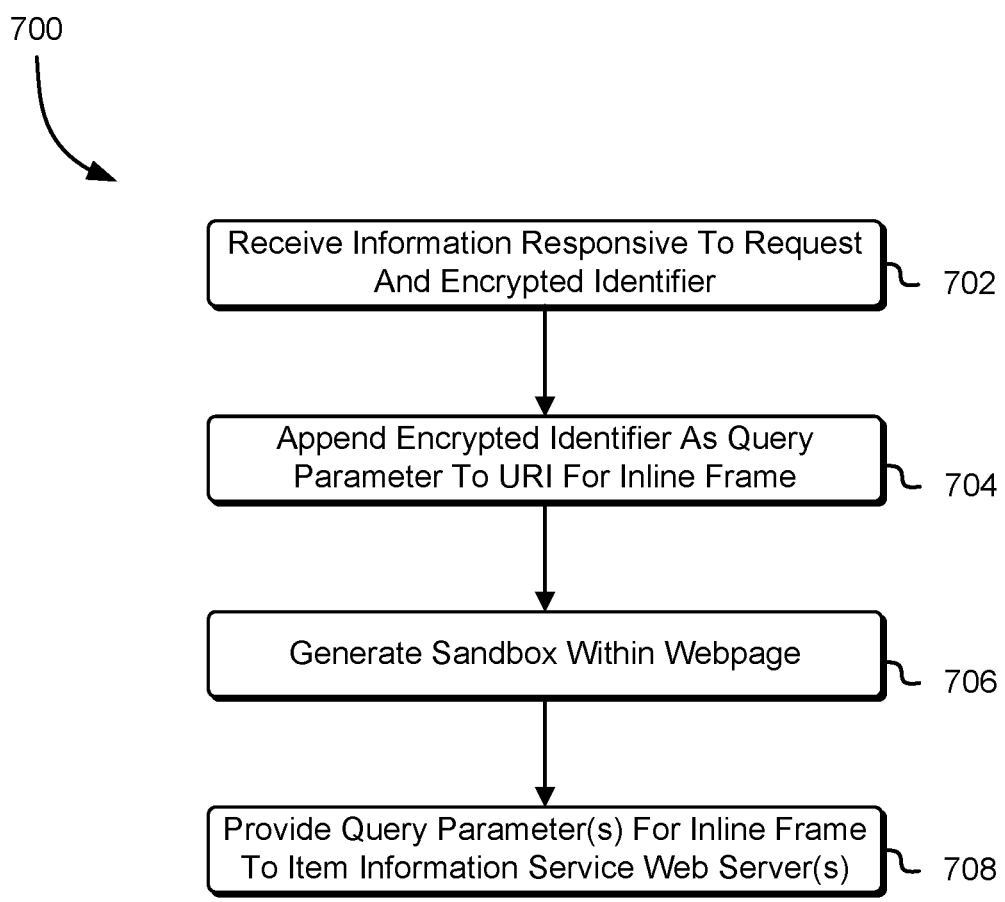
FIG. 7 shows an illustrative example of a process for providing query parameters for a sandbox usable to generate an inline frame within a user interface of a web browser in accordance with at least one embodiment.

As noted above, the item information application may generate a sandbox environment, in which an inline frame application may be initiated to evaluate item information purportedly from the item information service within the sandbox environment to determine whether the item information can be authenticated. The item information application may also provide the encrypted identifier to one or more item information service web servers, which may decrypt the encrypted identifier and provide the identifier to the inline frame application for its use in authenticating the item information. Accordingly, FIG. 7 shows an illustrative example of a process 700 for providing query parameters for a sandbox usable to generate an inline frame within a user interface of a browser application in accordance with at least one embodiment. The process 700 may be performed by the aforementioned item information application, which may obtain the encrypted identifier and item information from the item information service and may communicate with the one or more item information service web servers to make the encrypted identifier available.

In response to its request to obtain item information for a particular item specified in a webpage, the item information application may receive 702 information responsive to the request and an encrypted identifier from the item information service. The information responsive to the request may include the price at which the particular item is offered for sale by an online retail service associated with the item information service. Additionally, the information responsive to the request may specify other item information, such as customer reviews for the item, warranty information for the item, availability information, images of the item, and the like.

The item information application may append 704 the encrypted identifier included in the response to the request as a query parameter to the URI for the inline frame to be presented via the user interface of the browser application. Additionally, the item information application may generate 706 a sandbox environment within the webpage of the third party for creating the inline frame. This may cause an inline frame application to be initiated within the sandbox environment. This inline frame application, as will be described in greater detail below, may be used to determine whether item information purportedly generated by the item information service is authentic and has not been modified by an unauthorized entity, such as the third party that is providing the webpage. The item information application may provide 708 the URI for the inline frame, including the query parameters for the inline frame, and the encrypted identifier to the item information service web servers.

Figure 8:
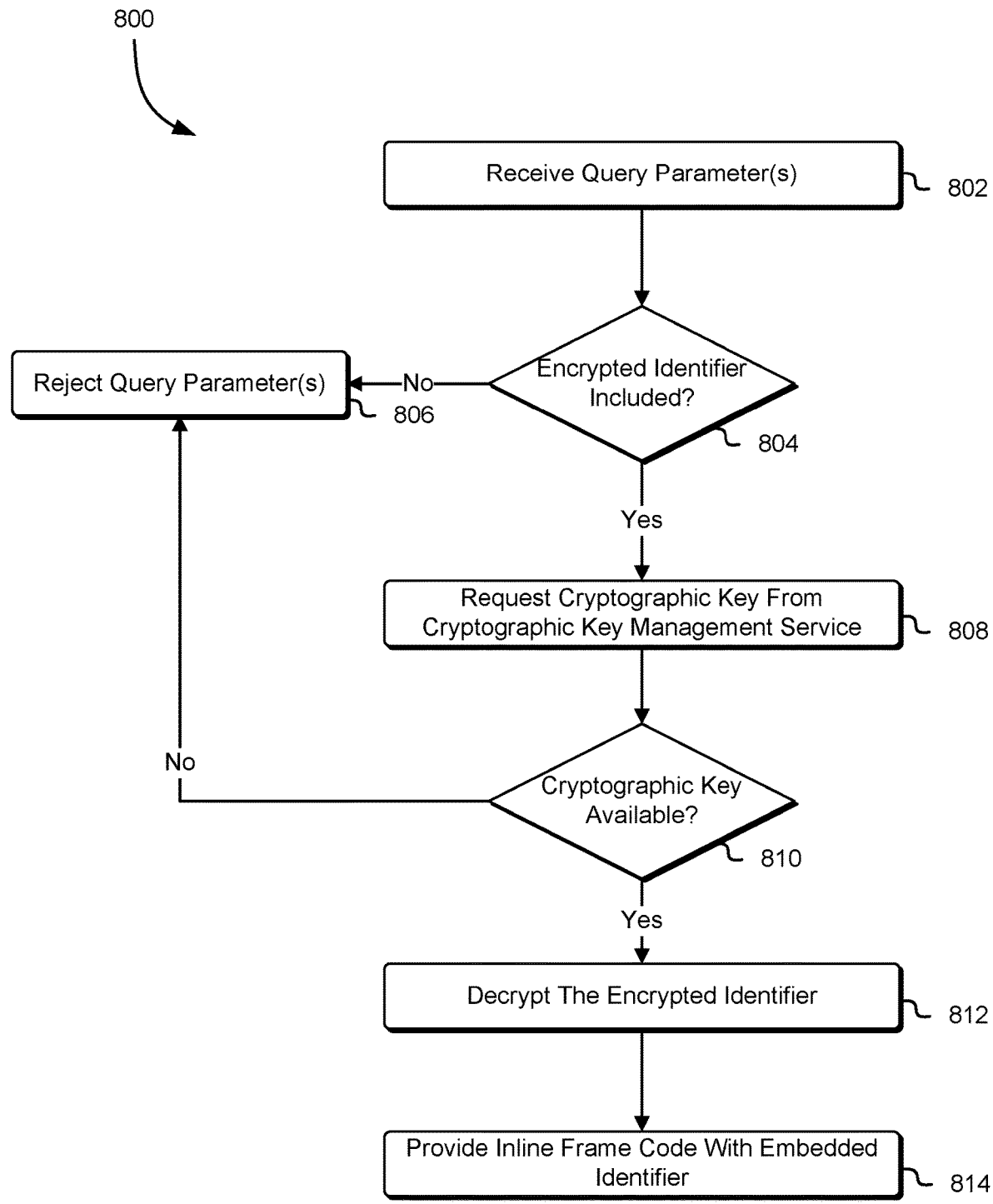
FIG. 8 shows an illustrative example of a process for providing inline frame code and a decrypted identifier for the request to obtain the price match information to an inline frame application in accordance with at least one embodiment.

As noted above, the item information service web servers may provide the markup language code and the identifier to the inline frame application operating within the sandbox environment to enable the inline frame application to authenticate item information provided by an item information application. The item information service web servers may, for instance, obtain a cryptographic key from the cryptographic key management service to decrypt the encrypted identifier provided by the item information application. Accordingly, FIG. 8 shows an illustrative example of a process 800 for providing inline frame code and a decrypted identifier for the request to obtain the price match information to an inline frame application in accordance with at least one embodiment. The process 800 may be performed by the aforementioned item information service web servers, which may obtain the query parameters and encrypted identifier from an item information application and may provide the identifier, once decrypted, and the markup language code for the inline frame to the inline frame application.

The item information service web servers may receive 802, from an item information application, a URI for an inline frame that includes one or more query parameters. In response to receiving the URI for the inline frame, the item information service web servers may determine 804 whether the query parameters for the URI specify an encrypted identifier. The identifier may be used by the inline frame application as part of a process to authenticate item information provided by the item information application for presentation via an inline frame on the browser application. Thus, if the query parameters do not include the encrypted identifier corresponding to the request from the item information application to the item information service, the item information service web servers may reject 806 the query parameters. This may cause the inline frame to not be presented via the user interface of the browser application.

If the query parameters provided by the item information application include the encrypted identifier, the item information service web services may request 808 the cryptographic key usable to decrypt the encrypted identifier from the cryptographic key management service. For instance, the item information service web servers may transmit, to the cryptographic key management service, the metadata of the encrypted identifier. As noted above, the metadata may specify an identifier of the cryptographic key usable to decrypt the encrypted identifier. The cryptographic key management service may use the metadata specified in the request to determine whether a cryptographic key corresponding to the identifier in the metadata is available for use. If there is no cryptographic key corresponding to the identifier specified in the metadata, the cryptographic key management service may transmit a response to the item information service web servers to indicate that the cryptographic key is not available. Alternatively, if the cryptographic key management service identifies a cryptographic key corresponding to the identifier specified in the metadata, the cryptographic key management service may provide the cryptographic key to the item information service web servers. Thus, based at least in part on the response from the cryptographic key management service, the item information service web servers may determine 810 whether the cryptographic key usable for decrypting the encrypted identifier is available.

It should be noted that in some embodiments, the item information service web servers transmit the encrypted identifier to the cryptographic key management service for decryption. In response to the request from the item information service web servers, the cryptographic key management service may use the metadata of the encrypted identifier to identify the cryptographic key that was used to encrypt the identifier. The cryptographic key management service may determine whether the cryptographic key is available and, if so, may use the cryptographic key to decrypt the encrypted identifier. The cryptographic key management service may provide the identifier to the item information service web servers to fulfill the request. Alternatively, if the cryptographic key management service determines that the cryptographic key is not available, the cryptographic key management service may reject the request with a notification indicating that the cryptographic key was not available for decrypting the encrypted identifier.

If the cryptographic key is not available for use in decrypting the encrypted identifier, the item information service web servers may reject 806 the provided query parameters, as the identifier may not be available for authenticating the item information provided by the item information service to the item information application. However, if the cryptographic key management service provides the cryptographic key usable to decrypt the encrypted identifier, the item information service web servers may decrypt 812 the encrypted identifier using the cryptographic key to obtain the identifier. It should be noted that if the item information service web servers provide the encrypted identifier to the cryptographic key management service, decryption of the encrypted identifier may be performed by the cryptographic key management service, which may provide the decrypted identifier to the item information service web servers.

The item information service web servers may generate the markup language code for the inline frame, which may be used to specify the dimensions of the inline frame and other features as they are to be presented via the user interface of the browser application. The item information service may provide 814 this markup language code for the inline frame, as well as the decrypted identifier, to the inline frame application operating within the sandbox environment. The inline frame application may use the identifier as part of a process for authenticating item information provided by the item information application and purportedly from an item information service.

Figure 9:
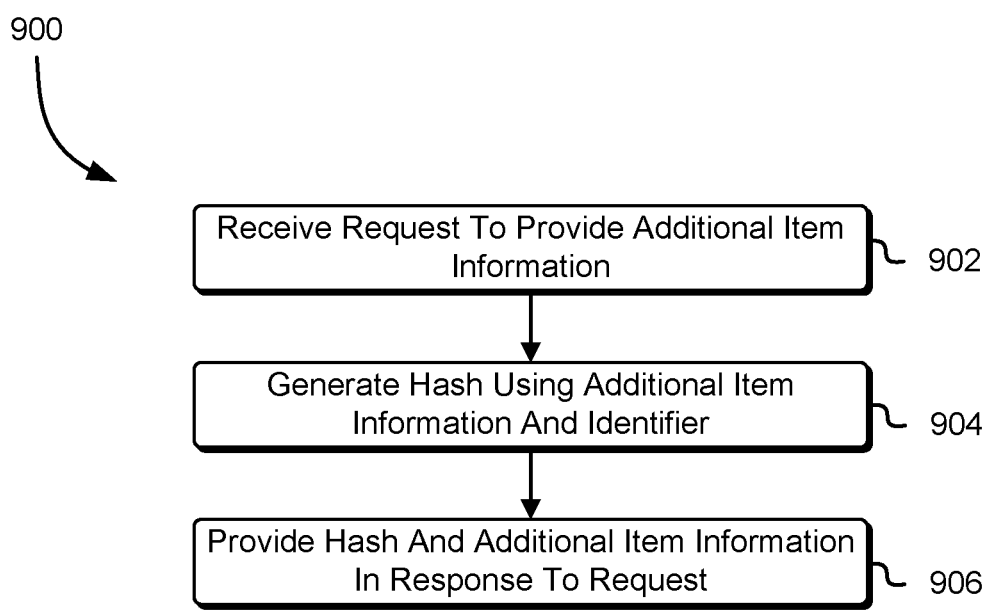
FIG. 9 shows a process for providing a hash generated using the additional item information from the item information service and the request identifier in response to a request from the inline frame application in accordance with at least one embodiment.

In response to receiving the markup language code for the inline frame and the identifier from the item information service web servers, the inline frame application may transmit a request to the item information application to provide the item information for the particular item and that is to be displayed via the inline frame. In response to the request, the item information application may use the item information from the item information service and the identifier as inputs to a hash algorithm to generate a hash. The item information service may provide this hash and the item information to the inline frame application to fulfill the request. Accordingly, FIG. 9 shows a process 900 for providing a hash generated using the item information from the item information service and the request identifier in response to a request from the inline frame application in accordance with at least one embodiment. The process 900 may be performed by the aforementioned item information application, which may utilize a hashing algorithm to generate hashes for delivery to the inline frame application. In some embodiments, the item information application and the inline frame application communicate via interprocess communication to transmit and receive requests and information as described herein.

As noted above, the inline frame application may transmit a request to the item information application to provide item information that may be presented via the inline frame. The item information application may receive 902 the request from the inline frame application to provide the item information. In response to the request, the item information application may use the item information and the identifier specific to the request made to the item information service to obtain the item information as inputs to a hashing algorithm to generate 904 a hash. The hashing algorithm may be a one-way function, which may include functions that are not necessarily one-way in the strict mathematical sense, but that exhibit properties that render the function useful in contexts in which the various techniques of the present disclosure are applied. The item information application may provide 906 the hash and the item information to the inline frame application to fulfill the request.

It should be noted that in some embodiments, the process 900 can also be performed by the inline frame application. For instance, if the inline frame application receives a request from the item information application to provide certain information for verifying the authenticity of the inline frame application, the inline frame application may use the identifier from the item information application web servers and the authentication information as inputs to a hashing algorithm to generate a hash. The inline frame application may provide the hash and the authentication information to the item information application. The item information application may use the identifier and the provided authentication information as inputs into the hashing algorithm to generate a second hash. If the hashes match, the item information application may determine that the provided authentication information has not been modified and may use it to authenticate the inline frame application.

Figure 10:
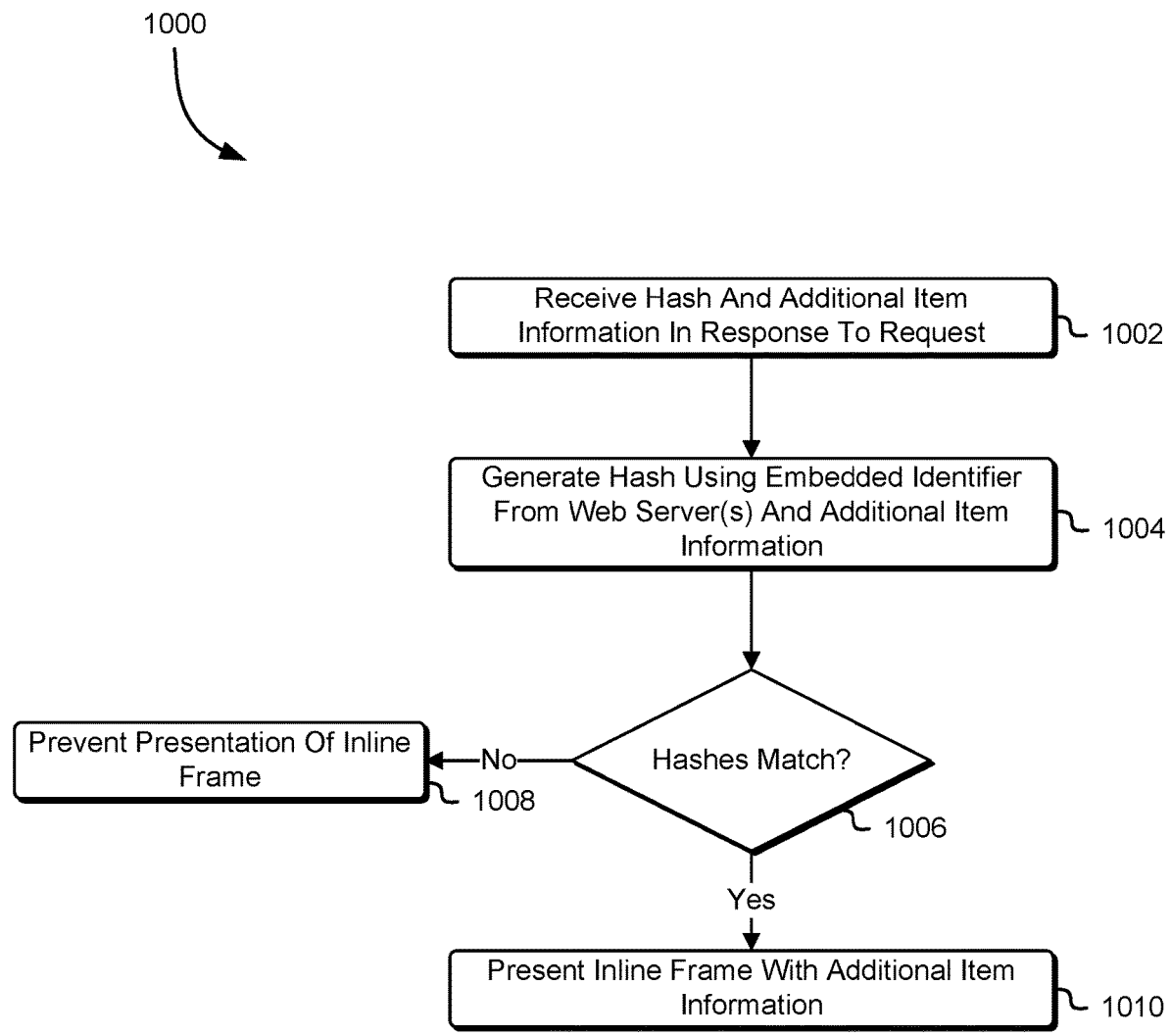
FIG. 10 shows a process for verifying that the additional item information originated from a trusted source and presenting the additional item information in an inline frame in accordance with at least one embodiment.

The inline frame application may use the hash and the item information provided by the item information application to determine whether the item information has been modified by an unauthorized entity. If the item information has been modified by an unauthorized entity, such as a third-party service that provided the webpage, the inline frame application may reject the item information and prevent presentation of the inline frame via the user interface of the browser application. However, if the inline frame application determines that the item information is authenticated and has not been modified by an unauthorized entity, the inline frame application may present the item information via the inline frame. The inline frame application may use the markup language code of the inline frame to present the inline frame via the user interface of the browser application. Accordingly, FIG. 10 shows a process 1000 for verifying that the item information originated from a trusted source and presenting the item information in an inline frame in accordance with at least one embodiment. The process 1000 may be performed by the aforementioned inline frame application, which may communicate with the item information application to obtain the item information and use the identifier provided by the item information service web servers to verify the authenticity of the provided item information.

As noted above, the inline frame application may transmit a request to the item information application to obtain the item information that is to be presented through the inline frame. This request may be made in response to receiving the markup language code for the inline frame and the decrypted identifier from the item information service web servers. In response to the request, the inline frame application may receive 1002 a hash and the item information from the item information application. The hash may be generated by the item information application using the identifier and the item information as inputs to a hashing algorithm.

The inline frame application may use the provided item information and the identifier obtained from the item information service web servers as input to a hashing algorithm to generate 1004 a second hash. The inline frame application may utilize the same hashing algorithm utilized by the item information application to generate the hash provided to the inline frame application. Using the second hash and the hash obtained from the item information application, the inline frame application may determine 1006 whether these hashes are identical. If the hashes are not identical, this may denote that the received item information is not identical to the item information used by the item information application to generate its hash. The inline frame application may determine that the item information has been modified by an unauthorized entity and cannot be used for presentation. Thus, if the inline frame application determines that the hashes are not identical, the inline frame application may prevent 1008 presentation of the inline frame via the user interface of the browser application. In an alternative embodiment, the inline frame application transmits a notification to the item information service to indicate that item information is being modified without authorization during transit. This may cause the item information service to perform remedial operations to prevent unauthorized modification of the information, including encrypting the information provided to the item information application, disguising the information such that a third-party may not recognize the information as being item information, and the like.

If the inline frame application determines that the hashes are identical, the inline frame application may determine that the item information provided by the item information application is authentic and originated from the item information service. The inline frame application may use the item information and the markup language code for the inline frame to present 1010 the inline frame via the user interface of the browser application, along with the item information provided by the item information service. Thus, the inline frame may specify item information for the item in conjunction with the information originally specified on the webpage provided by a third-party service.

Figure 11:
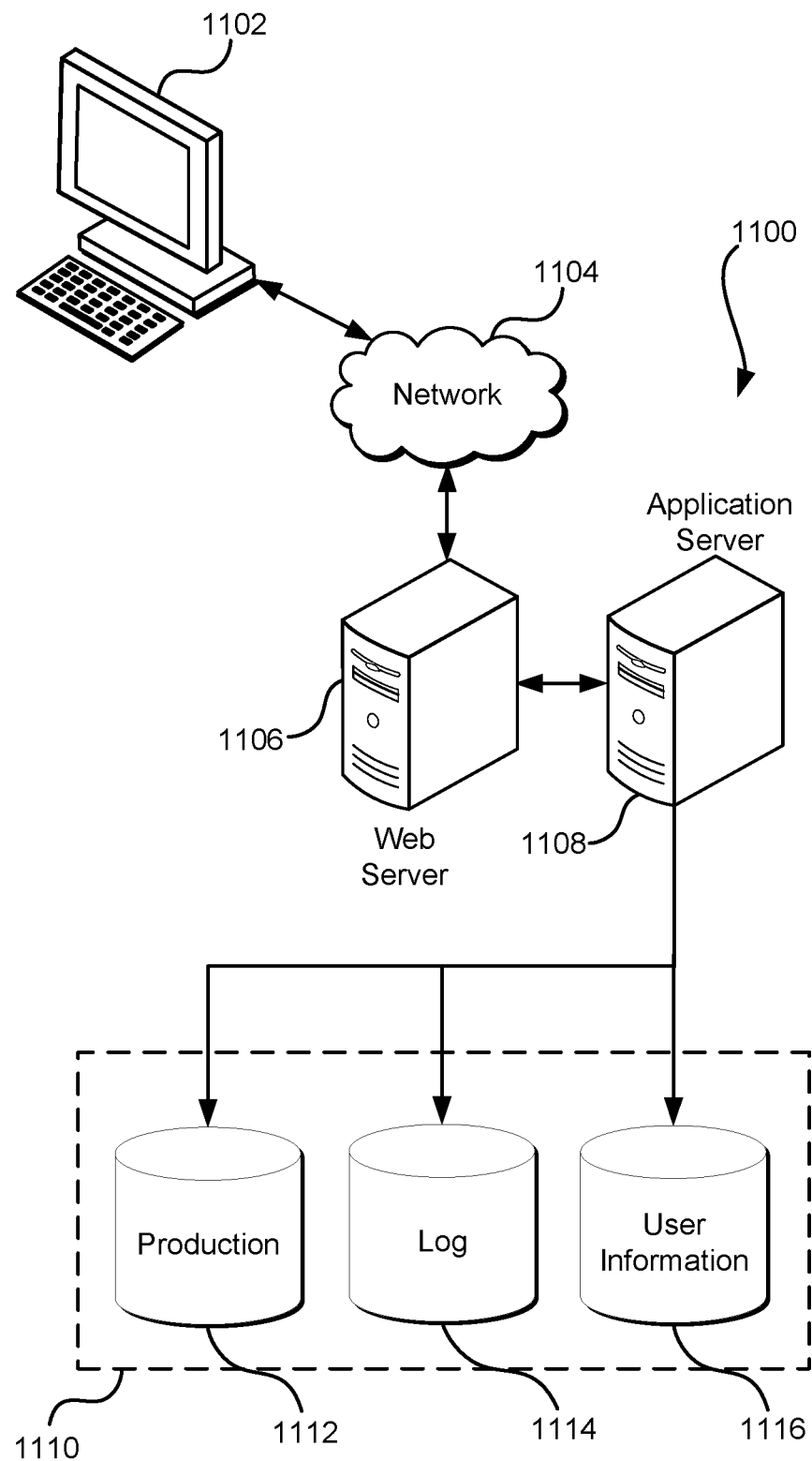
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium storing thereon executable instructions that, as a result of being executed by one or more processors of a computer system, cause the computer system to at least:
    evaluate markup language code for a webpage to detect first information associated with an item;
    transmit a request to obtain second information associated with the item and an identifier specific to the request;
    obtain, in response to the request, the second information and an encrypted identifier generated by encrypting the identifier with a cryptographic key;
    provide the encrypted identifier to a web server to cause the web server to decrypt the encrypted identifier to obtain the identifier and provide the identifier and markup language code for an inline frame presentable in conjunction with the webpage to an application for generating inline frames;
    obtain a request from the application to provide the second information;
    generate a hash based at least in part on the identifier and the second information; and
    provide the hash and the second information to the application to enable the application to use the hash and the second information to verify authenticity of the second information and present the inline frame with the second information.

2. The non-transitory computer-readable storage medium of claim 1, wherein the instructions further cause the computer system to modify the markup language code for the webpage to enable presentation of the inline frame.

3. The non-transitory computer-readable storage medium of claim 1, wherein the instructions further cause the computer system to launch the application within a sandbox environment in response to obtaining the second information and the encrypted identifier.

4. The non-transitory computer-readable storage medium of claim 1, wherein the instructions further cause the computer system to:
    evaluate markup language code for a second webpage;
    determine, based at least in part on the markup language code for the second webpage, that there is no information specific to any item; and
    monitor for presentation of a new webpage via a browser application.

5. The non-transitory computer-readable storage medium of claim 1, wherein the hash is a one-way function.

6. The non-transitory computer-readable storage medium of claim 1, wherein the encrypted identifier is appended to a uniform resource identifier (URI) for presentation to a browser.

7. A system, comprising at least one computing device that implements a set of one or more services, wherein the set of one or more services:
    obtains a request to retrieve:
    information; and
    code usable to generate an object within an application, the object usable to present the information;
    obtains a token in response to the request;
    provides the request and the token to another application;
    obtains, in response to providing the request and the token, an encrypted identifier based at least in part on the request and the token; and
    provides the code and the encrypted identifier to a user interface of the application to generate the object;
    obtains a second token specific to a second request to obtain second information and the code;
    provides the second request to obtain the second information;
    obtains, in response to the second request, the second information;
    determines, based at least in part on the object, that the second information has been modified; and
    transmits a notification to indicate that the second information has been modified to cause one or more remedial operations to be performed.

8. The system of claim 7, wherein the object is an inline frame embedded within a webpage presented via a user interface for presentation of the information.

9. The system of claim 7, wherein the set of one or more services further provides second code to generate an alternative object that omits the second information.

10. The system of claim 7, wherein the code is markup language code insertable into a webpage presented via the user interface to generate the object.

11. The system of claim 7, wherein the system provides a hash to the application, the hash generated based at least in part on the information and the token.

12. The system of claim 7, wherein the set of one or more services further:
    generates, based at least in part on the token and the information, second data; and
    determines that the information is authentic as a result of the second data being identical to data included in the object.

13. A computer-implemented method, comprising:
    in response to receiving a token specific to a request to obtain information that can be presented within a webpage, transmitting the token to obtain the information;
    obtaining, in response to the token, the information and data generated based at least in part on the information and the token, the data including an encrypted identifier;
    providing the encrypted identifier to a web server to cause the web server to decrypt the encrypted identifier to obtain an identifier and provide the identifier and markup language code for an object presentable in conjunction with the webpage to an application;
    as a result of obtaining a request from the application, providing an update to a user interface to embed the object within the webpage to present the information, the update including the identifiers;
in response to receiving a second identifier specific to a request to obtain second information, providing the request to obtain the second information;
obtaining, in response to the request to obtain the second information, the second information and second data generated based at least in part on the token and the second information;
determining, based at least in part on the second data, that the second information has been modified; and
transmitting a notification to a service that generated the second information to indicate that the second information has been modified.

14. The computer-implemented method of claim 13, wherein the update includes markup language code for the object that is insertable into markup language code for the webpage.

15. The computer-implemented method of claim 13, further comprising:

generating, based at least in part on the token and the information, second data;
comparing the second data and the data obtained in response to the request; and
determine that the information is authentic as a result of the second data being identical to the data obtained in response to the request.

16. The computer-implemented method of claim 13, wherein the data includes a hash generated based at least in part on the information and the token.

17. The computer-implemented method of claim 13, further comprising transmitting a second update to the user interface to embed a second object within the webpage, the second object usable to present information other than the second information.

18. The computer-implemented method of claim 13, wherein the object is an inline frame.

* * * * *